(12) United States Patent
Bellaccini et al.

(10) Patent No.: US 12,394,228 B2
(45) Date of Patent: Aug. 19, 2025

(54) SYSTEMS AND METHODS FOR UTILIZING A NEURAL NETWORK MODEL AND TEMPLATES TO GENERATE AN IMAGE CAPTION

(71) Applicant: Verizon Patent and Licensing Inc., Basking Ridge, NJ (US)

(72) Inventors: Niccolo Bellaccini, Florence (IT); Matteo Simoncini, Pistoia (IT); Douglas Coimbra De Andrade, Florence (IT); Francesco Sambo, Florence (IT)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 379 days.

(21) Appl. No.: 18/175,993

(22) Filed: Feb. 28, 2023

(65) Prior Publication Data
US 2024/0290118 A1    Aug. 29, 2024

(51) Int. Cl.
| | |
|---|---|
| *G06V 20/00* | (2022.01) |
| *G06F 16/51* | (2019.01) |
| *G06F 16/53* | (2019.01) |
| *G06F 16/58* | (2019.01) |
| *G06F 40/186* | (2020.01) |
| *G06F 40/279* | (2020.01) |
| *G06V 10/40* | (2022.01) |

(Continued)

(52) U.S. Cl.
CPC .............. *G06V 20/70* (2022.01); *G06F 16/51* (2019.01); *G06F 16/53* (2019.01); *G06F 16/5866* (2019.01); *G06F 40/186* (2020.01); *G06F 40/279* (2020.01); *G06V 10/40* (2022.01); *G06V 10/764* (2022.01); *G06V 10/82* (2022.01)

(58) Field of Classification Search
CPC ...... G06V 20/70; G06V 10/40; G06V 10/764; G06V 10/82; G06F 16/51; G06F 16/53; G06F 16/5866; G06F 40/186; G06F 40/279; G06F 40/56
See application file for complete search history.

(56) References Cited

U.S. PATENT DOCUMENTS

| | | | |
|---|---|---|---|
| 2017/0061250 A1* | 3/2017 | Gao | .................. G06V 20/70 |
| 2024/0282131 A1* | 8/2024 | Ren | .................. G06V 10/7753 |

OTHER PUBLICATIONS

Sharma et al, Image Captioning: Methods and Evaluation Metrics, 2nd International Conference on Intelligent Technologies (CONIT) (Year: 2022).*

(Continued)

*Primary Examiner* — Xiao Liu

(57) ABSTRACT

A device may receive a plurality of narratives associated with a plurality of scenes and an image identifying a scene not included in the plurality of scenes, and may process the image, with a classifier model, to detect a plurality of features in the image. The device may replace keywords in the plurality of narratives, with tags, to generate a plurality of sentences, and may group similar sentences of the plurality of sentences, based on a defined measure of dissimilarity, into clusters of templates. The device may select a candidate template from each of the clusters to generate a set of candidate templates, and may select a template from the set of candidate templates. The device may populate tags of the template with the plurality of features detected in the image to generate an image caption, and may provide the image and the image caption for display.

20 Claims, 10 Drawing Sheets

(51) Int. Cl.
  *G06V 10/764* (2022.01)
  *G06V 10/82* (2022.01)
  *G06V 20/70* (2022.01)

(56) References Cited

OTHER PUBLICATIONS

Li et al, Hybrid Retrieval-Generation Reinforced Agent for Medical Image Report Generation, Hybrid Retrieval-Generation Reinforced Agent for Medical Image Report Generation, arXiv:1805.08298v2 (Year: 2018).*

Kulkarni et al, Understanding and Generating Simple Image Descriptions,, IEEE Transactions on Pattern Analysis and Machine Intelligence, vol. 35, No. 12, Dec. 2013.*

Yang, et aI, Corpus-guided sentence generation of natural images, Proc. Conf. Empirical Methods Natural Language Process., pp. 444-454 (Year: 2011).*

* cited by examiner

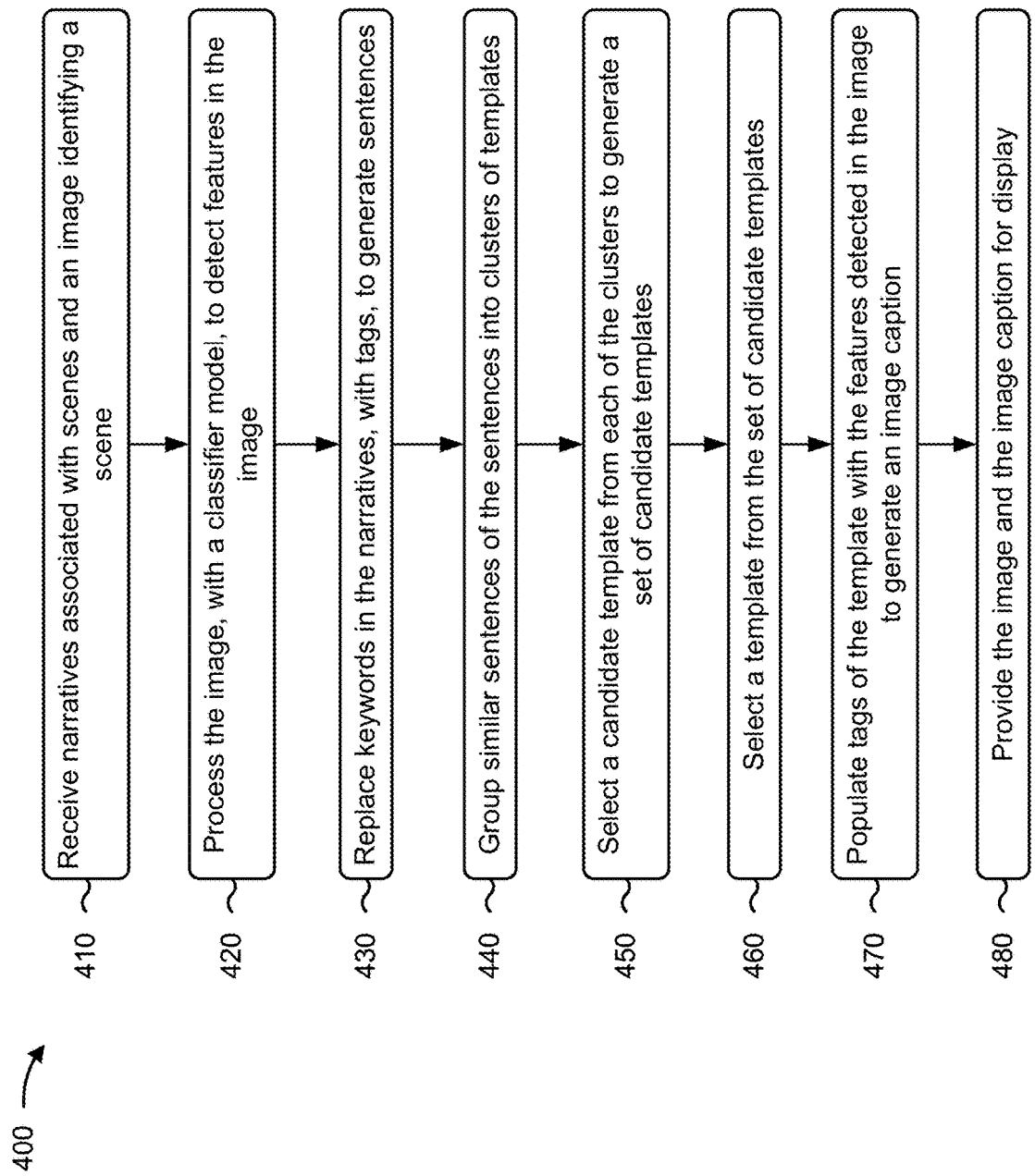

SYSTEMS AND METHODS FOR UTILIZING A NEURAL NETWORK MODEL AND TEMPLATES TO GENERATE AN IMAGE CAPTION

BACKGROUND

Image captioning includes generating textual descriptions from images, and thus lies at the intersection of computer vision (CV) techniques and natural language processing (NLP) techniques.

BRIEF DESCRIPTION OF THE DRAWINGS

FIG. 4 is a flowchart of an example process for utilizing a neural network model and templates to generate an image caption.

DETAILED DESCRIPTION OF EXAMPLE EMBODIMENTS

Figure 1A:
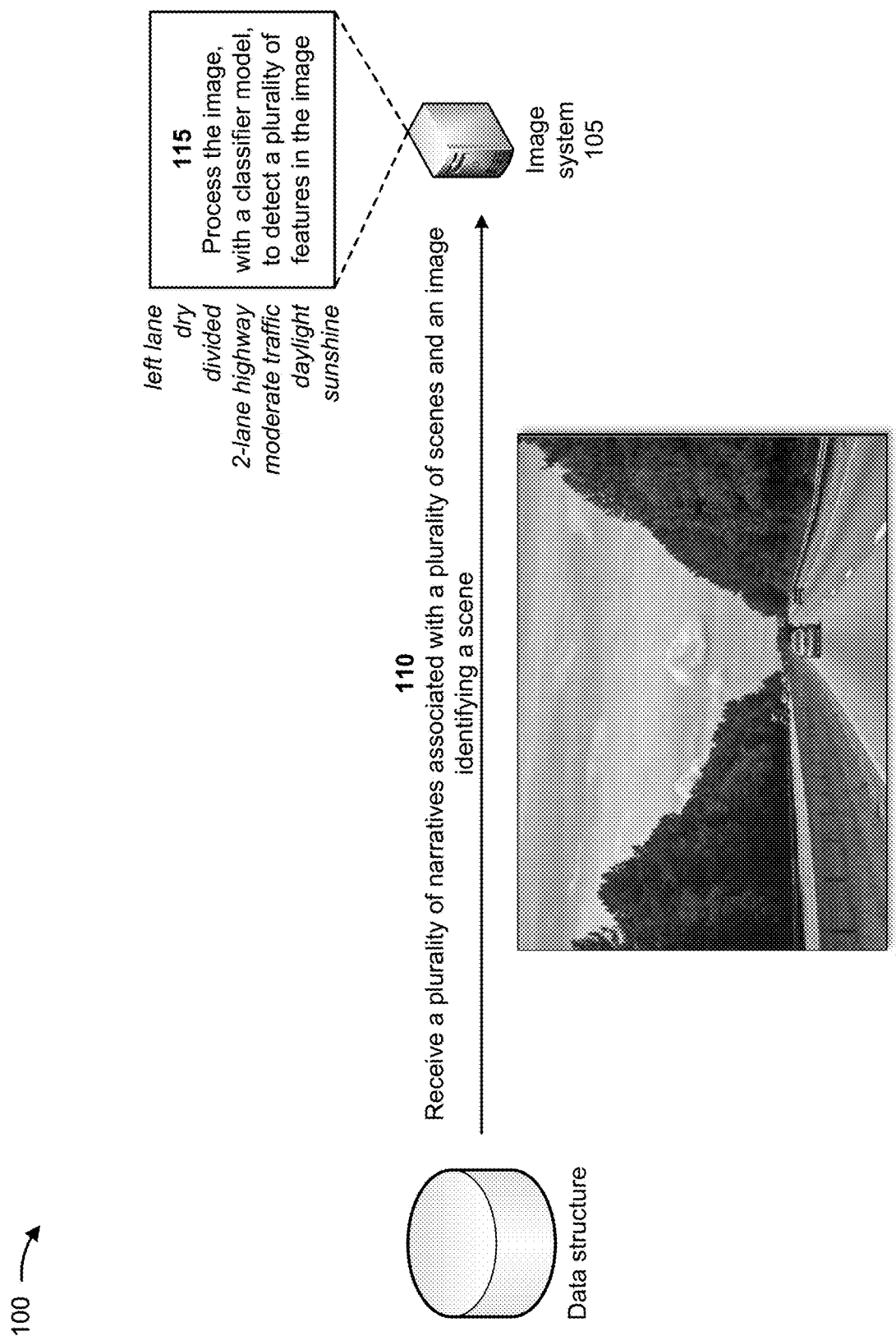
FIGS. 1A-1G are diagrams of an example associated with utilizing a neural network model and templates to generate an image caption.

The following detailed description of example implementations refers to the accompanying drawings. The same reference numbers in different drawings may identify the same or similar elements.

One challenge of image captioning stems from the compositional nature of natural language and visual scenes. Traditional captioning systems suffer from lack of compositionality and naturalness as they often generate captions in a sequential manner, where a next generated word depends on both a previous word and an image feature. This may lead to syntactically correct, but semantically irrelevant language structures, as well as to a lack of diversity in the generated captions. Another challenge of image captioning is dataset bias. Traditional captioning systems may overfit to common objects that co-occur in a common context (e.g., a bed and a bedroom), which leads to a problem when generalizing to scenes where the same objects appear in unseen contexts (e.g., a bed and a forest). Another challenge of image captioning is in the evaluation of the quality of generated captions. Automated quality metrics may be unsatisfactory evaluations of quality. In many cases, automated metrics scoring remains inadequate and sometimes even misleading, especially when scoring diverse and descriptive captions. Furthermore, automated captioning is difficult since two different people may provide two different descriptions of the same image, focusing on different aspects within the same image. Thus, current techniques for image captioning consume computing resources (e.g., processing resources, memory resources, communication resources, and/or the like), networking resources, and/or other resources associated with attempting and failing to correctly generate a caption for an image, generating an incorrect or biased caption for an image, discovering and correcting an incorrect or biased caption for an image, and/or the like.

Some implementations described herein provide an image system that utilizes a neural network model and templates to generate an image caption. For example, the image system may receive a plurality of narratives associated with a plurality of scenes and an image identifying a scene not included in the plurality of scenes, and may process the image, with a classifier model (e.g., a convolutional neural network classifier model), to detect a plurality of features in the image. The image system may replace keywords in the plurality of narratives, with tags, to generate a plurality of sentences, and may group similar sentences of the plurality of sentences, based on a defined measure of dissimilarity, into clusters of templates. The image system may select a candidate template from each of the clusters to generate a set of candidate templates, and may select a template from the set of candidate templates. The image system may select a proper cluster, and representative template inside the selected cluster may be defined as a most representative narrative (e.g., one with a shortest distance from the others). The image system may populate tags of the template with the plurality of features detected in the image to generate an image caption, and may provide the image and the image caption for display.

In this way, the image system utilizes a neural network model and templates to generate an image caption. For example, the image system may provide a template-based image captioning method for textual description generation of image scenes (e.g., road scenes). The image system may utilize a convolutional neural network to identify a set of environmental features shown in an image, and may automatically define a set of templates containing tags, where each tag may refer to a single, representative feature of the image. The image system may select a template from the set of templates, and may populate tags of the template with the environment features to generate an image caption. The image system may provide the image, with the image caption, for display to a user of the image system. Thus, the image system may conserve computing resources, networking resources, and/or other resources that would have otherwise been consumed by attempting and failing to correctly generate a caption for an image, generating an incorrect or biased caption for an image, discovering and correcting an incorrect or biased caption for an image, and/or the like.

FIGS. 1A-1G are diagrams of an example 100 associated with utilizing a neural network model and templates to generate an image caption. As shown in FIGS. 1A-1G, example 100 includes an image system 105 associated with a data structure. The image system 105 may include a system that utilizes a neural network model and templates to generate an image caption. The data structure may include a database, a table, a list, and/or the like. Further details of the image system 105 and the data structure are provided elsewhere herein.

As shown in FIG. 1A, and by reference number 110, the image system 105 may receive a plurality of narratives associated with a plurality of scenes and an image identifying a scene. For example, the plurality of textual narratives may be created for the plurality of scenes and may describe features of the plurality of scenes. The plurality of narratives may be stored in the data structure. A video device may capture the image identifying the scene (e.g., not included in the plurality of scenes), and may store the image in the data structure. In some implementations, a dashcam or another video device of a vehicle may record the image identifying the scene based on a trigger associated with an event, a driver of the vehicle may cause the image to be captured at a moment that the event occurs, and/or the like.

In some implementations, the image system 105 may continuously receive the plurality of narratives associated with the plurality of scenes and the image identifying the scene from the data structure, may periodically receive the plurality of narratives associated with the plurality of scenes and the image identifying the scene from the data structure, and may receive the plurality of narratives associated with the plurality of scenes and the image identifying the scene from the data structure based on requesting the plurality of narratives and the image from the data structure.

As further shown in FIG. 1A, and by reference number 115, the image system 105 may process the image, with a classifier model (e.g., a convolutional neural network (CNN)), to detect a plurality of features in the image. For example, the image system 105 may include the classifier model (e.g., a CNN multitask classifier model). In one example (e.g., when the image is associated with a road scene), the classifier model may be trained to detect a plurality of features in the image, such as lighting, weather, surface conditions, a quantity of lanes (e.g., contiguous and through travel), traffic flow, traffic density, locality, and/or the like. Each of the features may be associated with one or more sub-features. For example, lighting conditions may be associated with darkness-lightened, darkness-not-lightened, dawn-dusk, daylight, and/or the like. Since some features (e.g., weather and surface conditions) are not completely independent of each other, the classifier model may include a nonstandard classifier with a multitask classifier architecture. In some implementations, the classifier model may include a set of weight parameters shared by the features and another set of parameters specific to each individual feature. For example, as shown in FIG. 1A, the image system 105 may process the image, with classifier model, to detect the plurality of features in the image, such as "left lane," "dry," "divided," "2-lane highway," "moderate traffic," "daylight," "sunshine," and/or the like. In this way, the image system 105 may predict related features at the same time by using a shared weight representation and decreasing a total time of inference without losing accuracy.

In some implementations, the image system 105 may receive additional information, such as information associated with a speed of a vehicle during image capture, a maximum speed allowed on a road, a name of a road and a direction of a vehicle, an action of a driver (e.g., accelerating, decelerating, braking, turning) during image capture, and/or the like. In such implementations, the image system 105 may process the image and the additional information, with the CNN classifier model, to detect the plurality of features in the image.

Figure 1B:
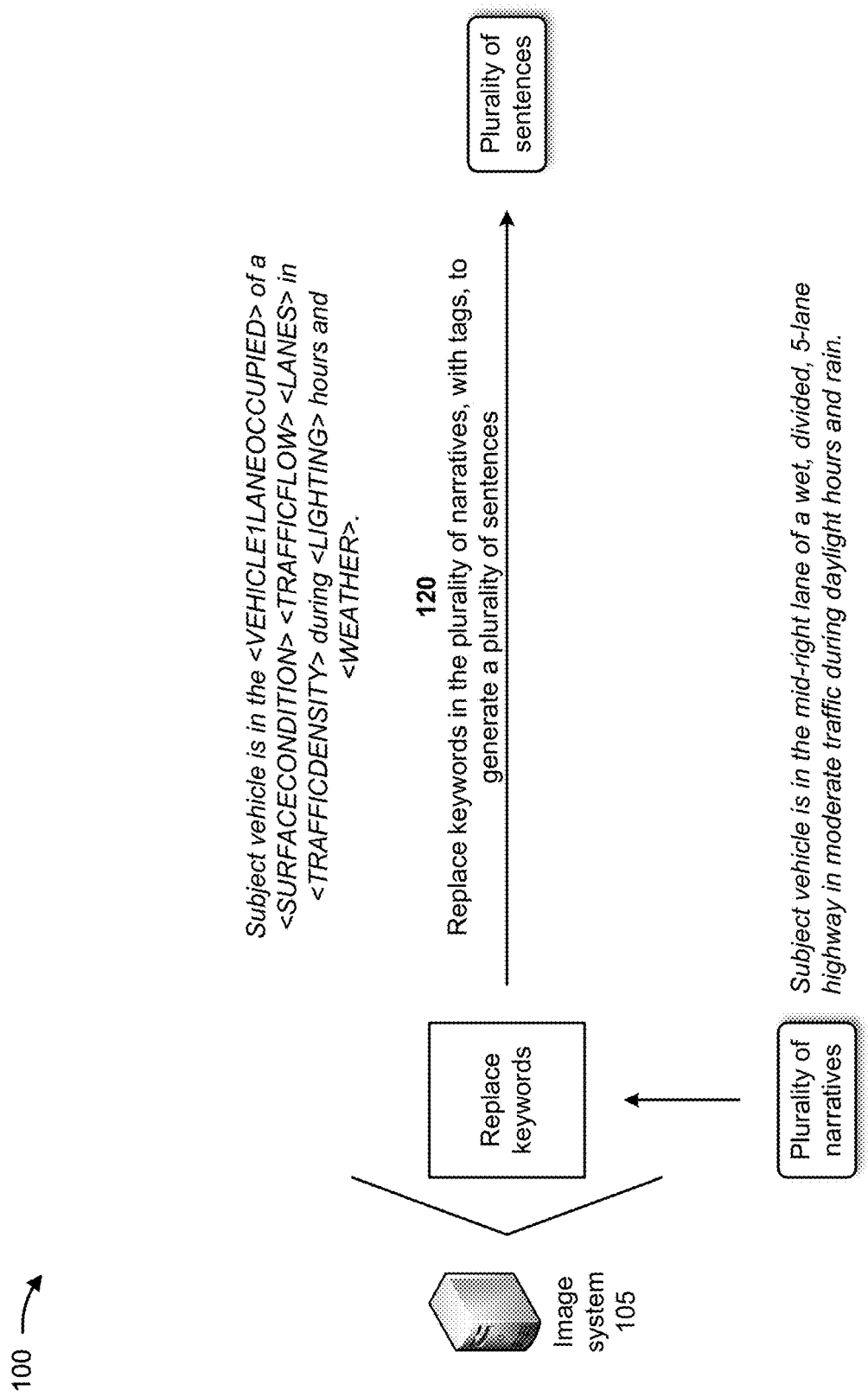

As shown in FIG. 1B, and by reference number 120, the image system 105 may replace keywords in the plurality of narratives, with tags, to generate a plurality of sentences. For example, the plurality of narratives may include textual information describing the plurality of scenes. The textual information may include keywords identifying features of the plurality of scenes. In some implementations, when the plurality of scenes are associated with road scenes, the keywords in the plurality of narratives may include keywords associated with lighting, weather, surface conditions, a quantity of lanes, traffic flow, traffic density, locality, presence of a person in front of a vehicle, presence of another vehicle in front of a vehicle, presence of roadwork, presence of an intersection or a roundabout, a type of intersection (controlled by a stop sign or a traffic light), and/or the like. For example, as shown in FIG. 1B, one of the plurality of narratives may be "subject vehicle is in the mid-right lane of a wet, divided, 5-lane highway in moderate traffic during daylight hours and rain." In such an example, the image system 105 may identify the following keywords: "mid-right lane," "wet," "divided," "5-lane highway," "moderate traffic," "daylight," and "rain." The image system 105 may replace these keywords with tags, such as "VEHICLEILANEOCCUPIED," "SURFACECONDITION," "TRAFFICFLOW," "LANES," "TRAFFICDENSITY," "LIGHTING," "WEATHER," to generate a sentence. As shown in FIG. 1B, the sentence may be "Subject vehicle is in the <VEHICLEILANEOCCUPIED> of a <SURFACECONDITION> <TRAFFICFLOW> <LANES> in <TRAFFICDENSITY> during <LIGHTING> hours and <WEATHER>." In some implementations, the image system 105 may replace the keywords in all of the plurality of narratives, with the tags, to generate the plurality of sentences.

Other example sentences generated by the image system 105 may include "subject vehicle is on a <contigTravelLanes>-lane <locality> related roadway. It is <lighting> with <weather> and <trafficDensity> traffic;" "subject vehicle is on a <trafficFlow> <contigTravelLanes>-lane road <locality> in <trafficDensity> traffic during the <lighting>;" and "subject vehicle is on a <contigTravelLanes>-lane <trafficFlow> <locality> with <trafficDensity> traffic in the <lighting>." In some implementations, when replacing the keywords in the plurality of narratives, with the tags, to generate the plurality of sentences, the image system 105 may identify the keywords in the plurality of narratives and may match the tags with the keywords. The image system 105 may replace the keywords in the plurality of narratives, with the tags, to generate the plurality of sentences based on matching the tags with the keywords.

Figure 1C:
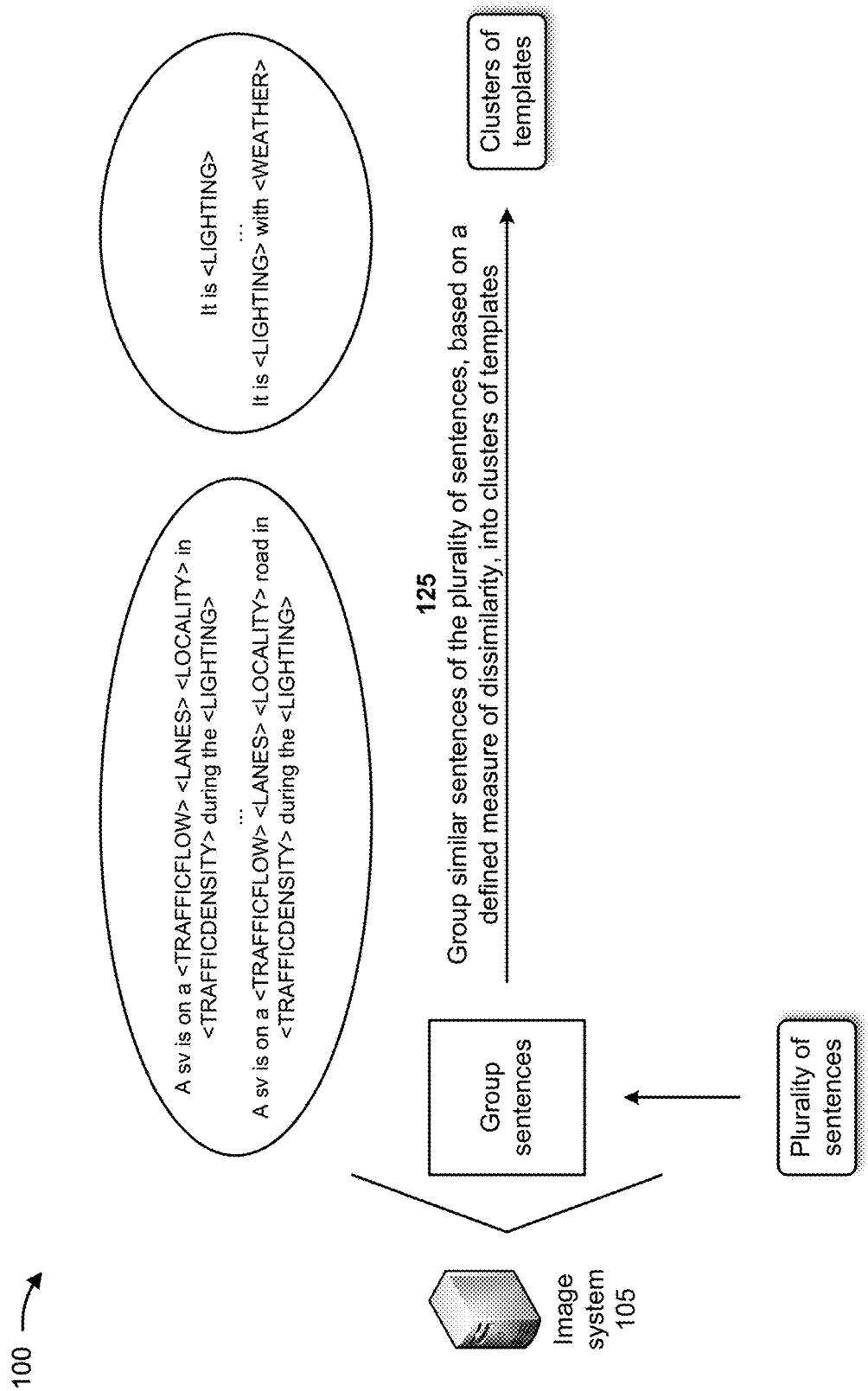

As shown in FIG. 1C, and by reference number 125, the image system 105 may group similar sentences of the plurality of sentences, based on a defined measure of dissimilarity, into clusters of templates. For example, the image system 105 may utilize the defined measure of dissimilarity to identify similar sentences of the plurality of sentence, and may group the similar sentences into the clusters of templates. In one example, as shown in FIG. 1C, the image system 105 may group the sentences "A sv is on a <TRAFFICFLOW> <LANES> <LOCALITY> in <TRAFFICDENSITY> during the <LIGHTING>" and "A sv is on a <TRAFFICFLOW> <LANES> <LOCALITY> road in <TRAFFICDENSITY> during the <LIGHTING>" in a first cluster of templates. The image system 105 may group the sentences "It is <LIGHTING>" and "It is <LIGHTING> with <WEATHER>" in a second cluster of templates.

In some implementations, when grouping similar sentences of the plurality of sentences, based on the defined measure of dissimilarity, into the clusters of templates, the image system 105 may utilize an agglomerative cluster method to group the similar sentences of the plurality of sentences, based on a dissimilarity matrix, into the clusters of templates. The agglomerative cluster method may include a definition of a dissimilarity matrix D, with an N total number of sentences, as:

$$D = \begin{bmatrix} 0 & \cdots & \cdots \\ \vdots & \ddots & \vdots \\ \cdots & \cdots & 0 \end{bmatrix}$$

with $d_{i,j}=d_{j,i} \geq 0$ and $d_{i,i}=0$. The sentence pairwise dissimilarity may be defined as:

$$d_{i,j} = 1 - \frac{(meteorScore(Ref_i, Hyp_j) + meteorScore(Hyp_i, Ref_j))}{2},$$

where the meteor score is a metric for evaluating similarities between an hypothesis sentence and a reference sentence. Meteor (Metric for Evaluation of Translation with Explicit Ordering) may be one of the metrics used to automatically evaluate two sentences and may correlate better with human judgment than other metrics.

Figure 1D:
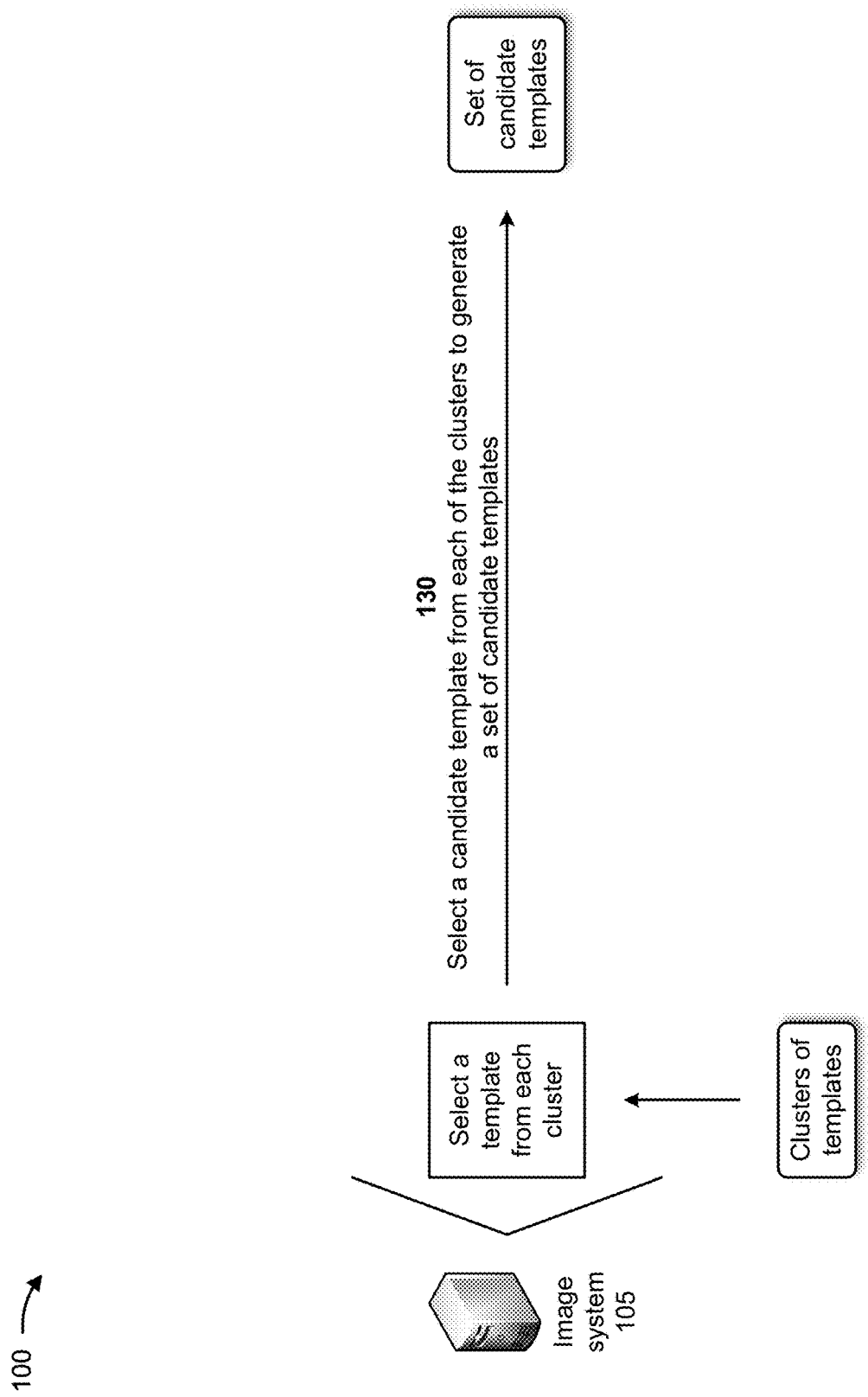

As shown in FIG. 1D, and by reference number 130, the image system 105 may select a candidate template from each of the clusters to generate a set of candidate templates. For example, the image system 105 may select the candidate template from each of the clusters to generate the set of candidate templates by selecting, from each cluster, a candidate template with a minimum average dissimilarity within each cluster. In some implementations, each candidate template, of the set of candidate templates, may be representative of a corresponding one of the clusters. In one example, for a cluster C with a cardinality (m) and a dissimilarity matrix (D') of candidate templates of the cluster C, the image system 105 may calculate the candidate template of each cluster as:

$$\operatorname{argmin}_i \frac{1}{m} \sum_{j=1}^{m} D'_{i,j}.$$

In some implementations, when selecting the candidate template from each of the clusters to generate the set of candidate templates, the image system 105 may select the candidate template from each of the clusters, based on a cardinality of each of the clusters and based on a dissimilarity matrix of sentences in each of the clusters, to generate the set of candidate templates.

In one example, a cluster may include the following templates: (1) "The subject vehicle is driving on a <TRAFFICFLOW> <LANES> <LOCALITY> road with <TRAFFICDENSITY> in the <LIGHTING>"; (2) "The subject vehicle is on a <LANES> <TRAFFICFLOW> <LOCALITY> roadway with <TRAFFICDENSITY> in the <LIGHTING>"; (3) "The subject vehicle is driving on a <LANES> <TRAFFICFLOW> <LOCALITY> road with <TRAFFICDENSITY> in the <LIGHTING>"; and (4) "The subject vehicle is driving straight at a constant speed in the <VEHICLEILANEOCCUPIED> of a <LANES> <TRAFFICFLOW> road in a <LOCALITY> area during the day in <TRAFFICDENSITY>." The image system 105 may calculate the following dissimilarity matrix between each of the templates of the cluster:

| 0    | 0.15 | 0.01 | 0.56 |
|------|------|------|------|
| 0.15 | 0    | 0.11 | 0.60 |
| 0.01 | 0.11 | 0    | 0.51 |
| 0.56 | 0.60 | 0.51 | 0    |

The average of each row (or each column) in the dissimilarity matrix may provide a mean distance of a template from to all other templates. In this example, the mean distance for templates (1) through (4) may be calculated as [0.18, 0.21, 0.16, 0.42]. Thus, the image system 105 may determine that template (3) is the most representative template (e.g., the candidate template) for this cluster. The following are examples of the candidate templates that represent clusters of templates: (1) "A subject vehicle is on a <trafficFlow> <contigTravelLanes>-lane road <locality> in <trafficDensity> traffic during the <lighting>"; (2) "The subject vehicle is on a <contigTravelLanes>-lane <trafficFlow> <locality> with <trafficDensity> traffic in the <lighting>"; (3) "Subject vehicle is on a <surfaceCondition> <trafficFlow> <locality>-area road during <lighting> there is <weather> and there is <trafficDensity> traffic"; and (4) "Subject vehicle is on a <contigTravelLanes>-lane <locality> related roadway. It is <lighting> with <weather> and <trafficDensity> traffic."

Figure 1E:
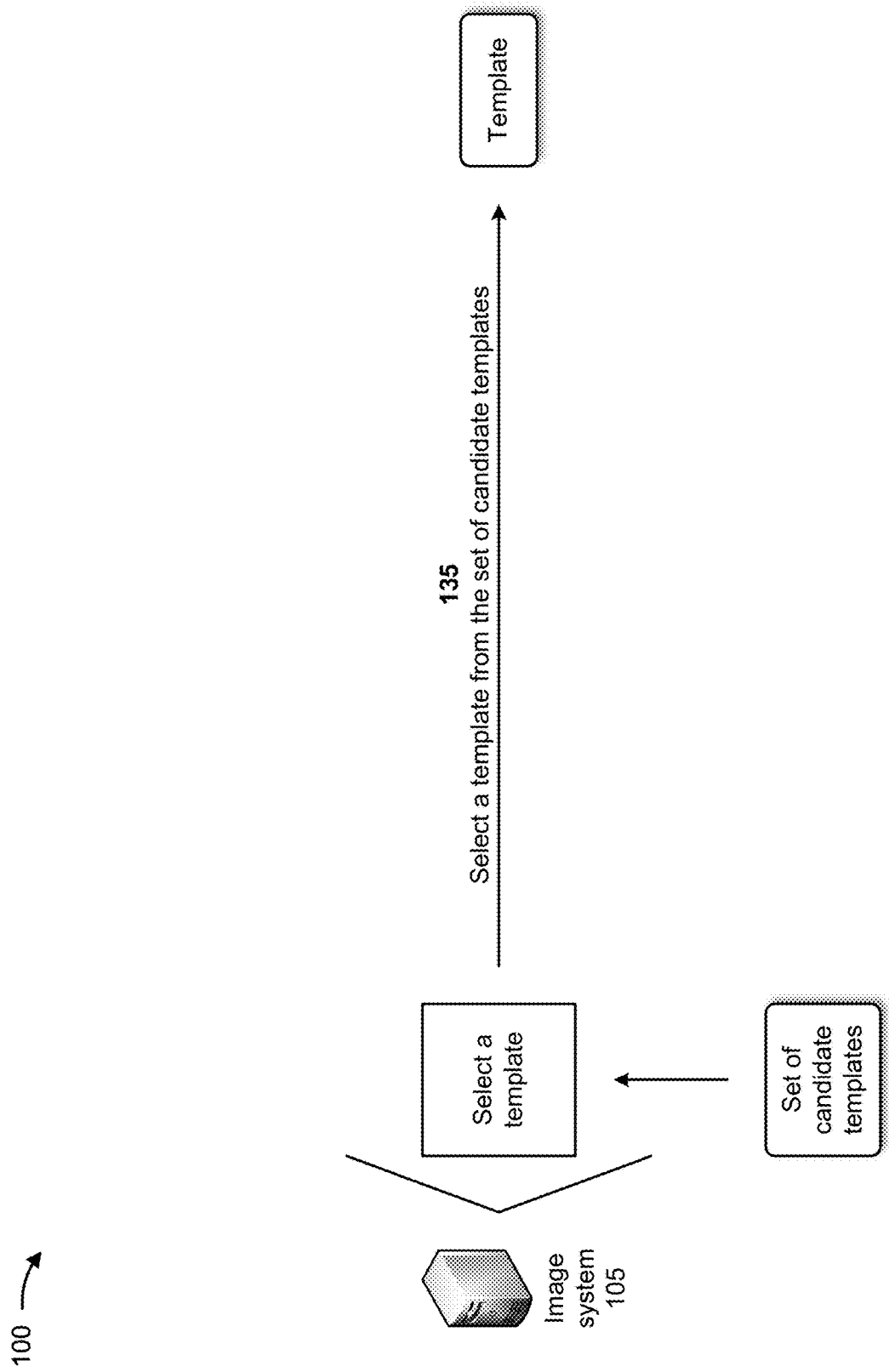

As shown in FIG. 1E, and by reference number 135, the image system 105 may select a template from the set of candidate templates. For example, when selecting the template from the set of candidate templates, the image system 105 may utilize a greedy strategy to select the template from the set of candidate templates. For example, the greedy strategy may include selecting a template from a set of candidate templates, and selecting a next possible template in order to obtain a best possible improvement in terms of a metric. This process may be repeated a predetermined quantity of times or until a desired image description coverage is attained. In one example, candidate templates $T_1$, $T_2$, $T_3$, and $T_4$ may be scored with scores $(s_1, \ldots, s_6)$ based on an evaluation metric to generate:

|       | $T_1$ | $T_2$ | $T_3$ | $T_4$ |
|-------|-------|-------|-------|-------|
| $s_1$ | 0.8   | 0.7   | 0.3   | 0.1   |
| $s_2$ | 0.2   | 0.3   | 0.8   | 0.2   |
| $s_3$ | 0.8   | 0.7   | 0.3   | 0.1   |
| $s_4$ | 0.2   | 0.3   | 0.8   | 0.15  |
| $s_5$ | 0.1   | 0.2   | 0.15  | 0.6   |
| $s_6$ | 0.1   | 0.1   | 0.15  | 0.7   |

If $T_1$ is the first selected template, the image system 105 may calculate a maximum of $T_1$ with respect to the other templates to obtain the following results:

|         | $\text{Max}(T_1, T_2)$ | $\text{Max}(T_1, T_3)$ | $\text{Max}(T_1, T_4)$ |
|---------|------------------------|------------------------|------------------------|
|         | 0.8                    | 0.8                    | 0.8                    |
|         | 0.3                    | 0.8                    | 0.2                    |
|         | 0.8                    | 0.8                    | 0.8                    |
|         | 0.3                    | 0.8                    | 0.2                    |
|         | 0.2                    | 0.15                   | 0.6                    |
|         | 0.1                    | 0.15                   | 0.7                    |
| Average | 0.42                   | 0.58                   | 0.55                   |

Based on the above table, template $T_3$ may be the template that provides the best possible improvement after the choice of template $T_1$.

In some implementations, when selecting the template from the set of candidate templates, the image system 105 may select a plurality of templates from the set of candidate templates, and may utilize a set of conditions (e.g., if-else conditions) to select the template from the plurality of templates. In some implementations, when selecting the template from the set of candidate templates, the image system 105 may process the set of candidate templates, with a neural network model, to select the template from the set of candidate templates. For example, the image system 105 may train the neural network model to select the template from the set of candidates for a given image. The neural network model may be trained end-to-end on data collected by showing an image and generated predictions to users and having the users select a most informative template. In this way, the neural network model may learn that "sunny" is not informative and thus may select a template not considering the weather if the prediction for the weather category is "sunny" (e.g., and vice-versa that "snowy" is highly informative).

In some implementations, the image system 105 may generate modular templates in which a given portion of a sentence (e.g., the weather is <WEATHER>) is generated only if a confidence with a prediction of the sentence above a given threshold. In some implementations, the image system 105 may generate a modular template where each portion of a sentence is associated with a variable that gets produced by the image system 105 and indicates a relevance of a particular attribute. For example, the image system 105 may output a class of a variables (e.g., sunny) with a confidence (e.g., 0.95) and a relevance of the prediction (e.g., 0.3). In such an example, the template may include the weather portion only if the relevance is above a given threshold.

In some implementations, the image system 105 may utilize a recurrent neural network model for dynamic image captioning generation. The recurrent neural network model may include an encoder-decoder architecture with an encoder network acting as a feature extractor and a decoder with at least an embedding layer, a long short-term memory (LSTM), and a fully convolutional layer at the end. The recurrent neural network may utilize, for example, a cross entropy function as loss function with an Adam optimizer. Such an architecture may produce an image caption that is not bound to any kind of constraint, which may lead to sentences with a partial description of a scene (or focused on irrelevant details) or even worst to syntactically wrong sentences.

Figure 1F:
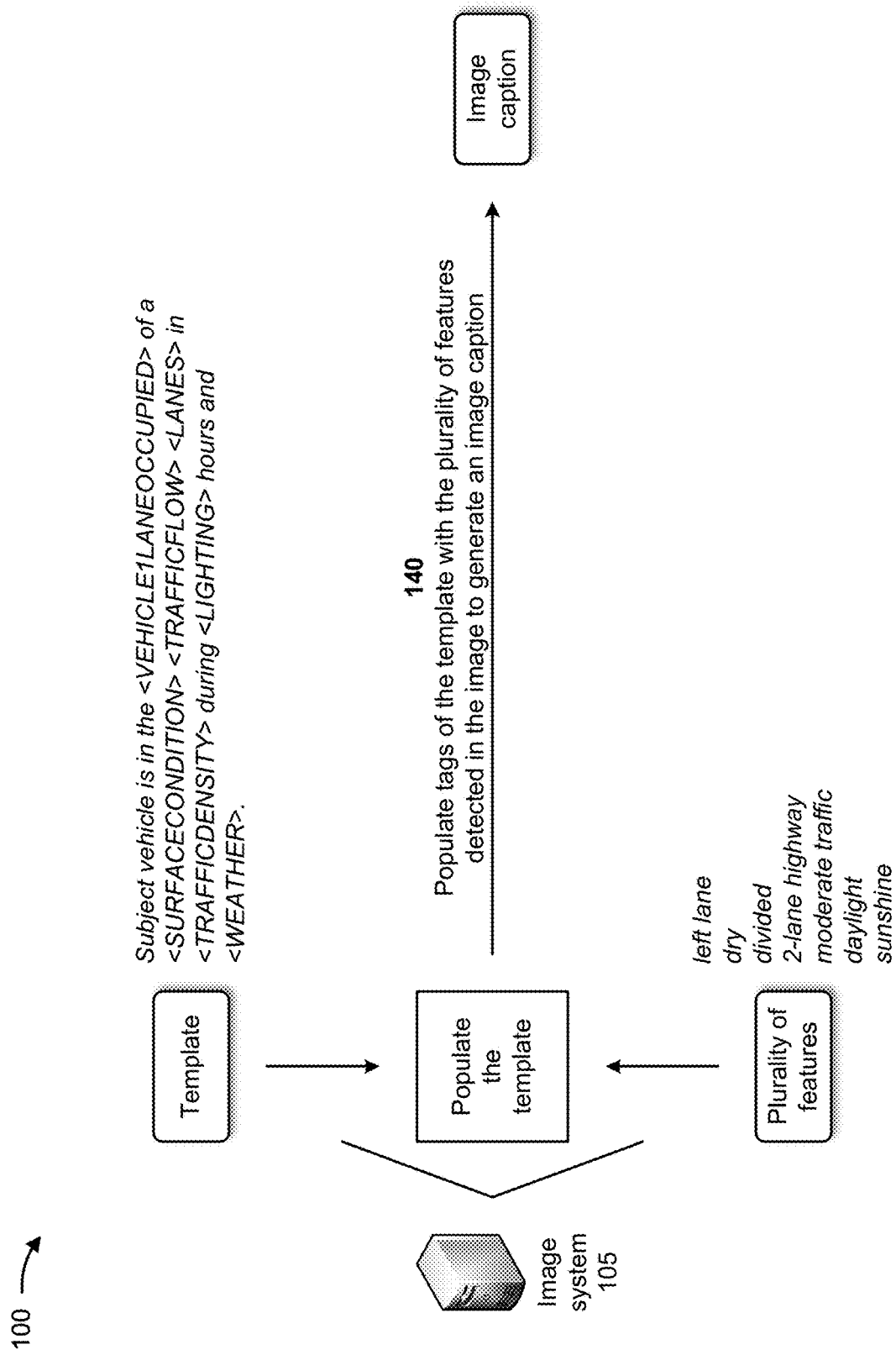

As shown in FIG. 1F, and by reference number 140, the image system 105 may populate tags of the template with the plurality of features detected in the image to generate an image caption. For example, the image system 105 may replace the tags of the template with corresponding ones of the plurality of features detected in the image to generate the image caption. In one example, as shown in FIG. 1F, if the plurality of features are "left lane," "dry," "divided," "2-lane highway," "moderate traffic," "daylight," and "sunshine," and the tags of the template are "VEHICLE1LANEOCCU-PIED," "SURFACECONDITION," "TRAFFICFLOW," "LANES," "TRAFFICDENSITY," "LIGHTING," "WEATHER," the image system may replace "VEHICLE1LANEOCCUPIED" with "left lane," may replace "SURFACECONDITION" with "dry," may replace "TRAFFICFLOW" with "divided," may replace "LANES" with "2-lane highway," may replace "TRAFFICDENSITY" with "moderate traffic," may replace "LIGHTING" with "daylight," and may replace "WEATHER" with "sunshine." Based on such replacements, the image system 105 may generate an image caption that states "Subject vehicle is in the left lane of a dry, divided, 2-lane highway in moderate traffic during daylight hours and sunshine."

Figure 1G:
Figure 1G:
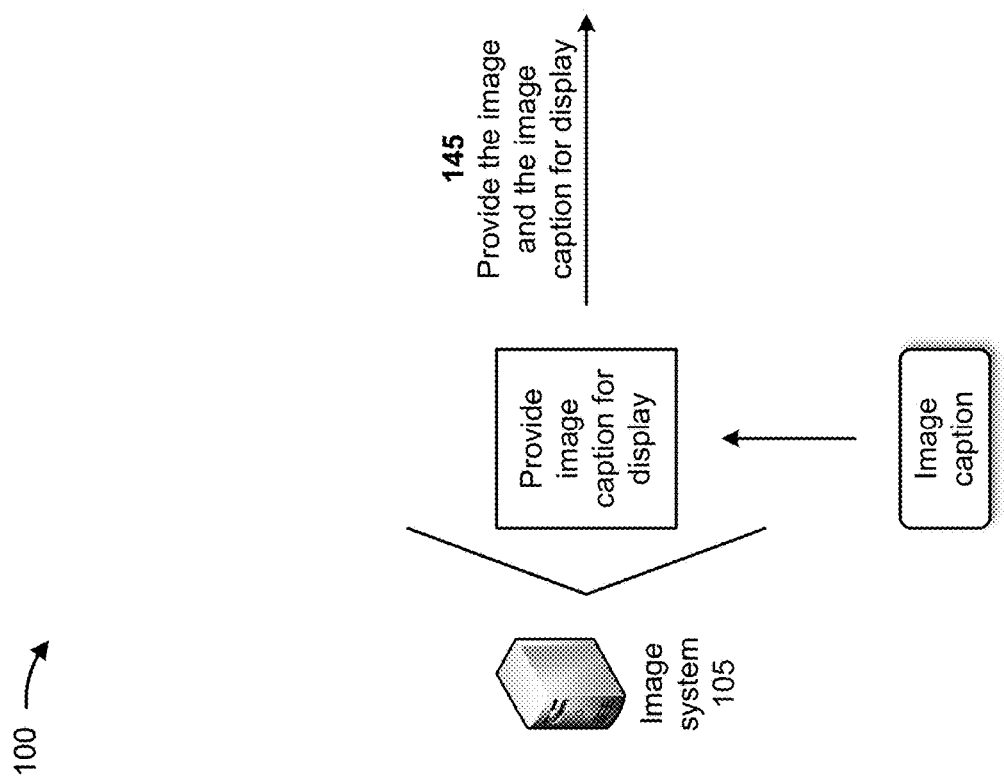

As shown in FIG. 1G, and by reference number 145, the image system 105 may provide the image and the image caption for display. For example, the image system 105 may associate the image caption with the image and may provide the image and the image caption display to a user of the image system 105. In some implementations, the image system 105 may store the image and the image caption in a data structure. In such implementations, the image stored in the data structure may be searchable via textual query and based on the image caption. In some implementations, the image system 105 may provide the image caption to a text-to-speech system configured to convert the image caption into audio. The audio may be played so that visually impaired users may determine what is depicted in the image.

In this way, the image system 105 utilizes a neural network model and templates to generate an image caption.

For example, the image system 105 may provide a template-based image captioning method for textual description generation of image scenes (e.g., road scenes). The image system 105 may utilize a convolutional neural network to identify a set of environmental features shown in an image, and may automatically define a set of templates containing tags, where each tag may refer to a single, representative feature of the image. The image system 105 may select a template from the set of templates, and may populate tags of the template with the environment features to generate an image caption. The image system 105 may provide the image, with the image caption, for display to a user of the image system 105. Thus, the image system 105 may conserve computing resources, networking resources, and/or other resources that would have otherwise been consumed by attempting and failing to correctly generate a caption for an image, generating an incorrect or biased caption for an image, discovering and correcting an incorrect or biased caption for an image, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
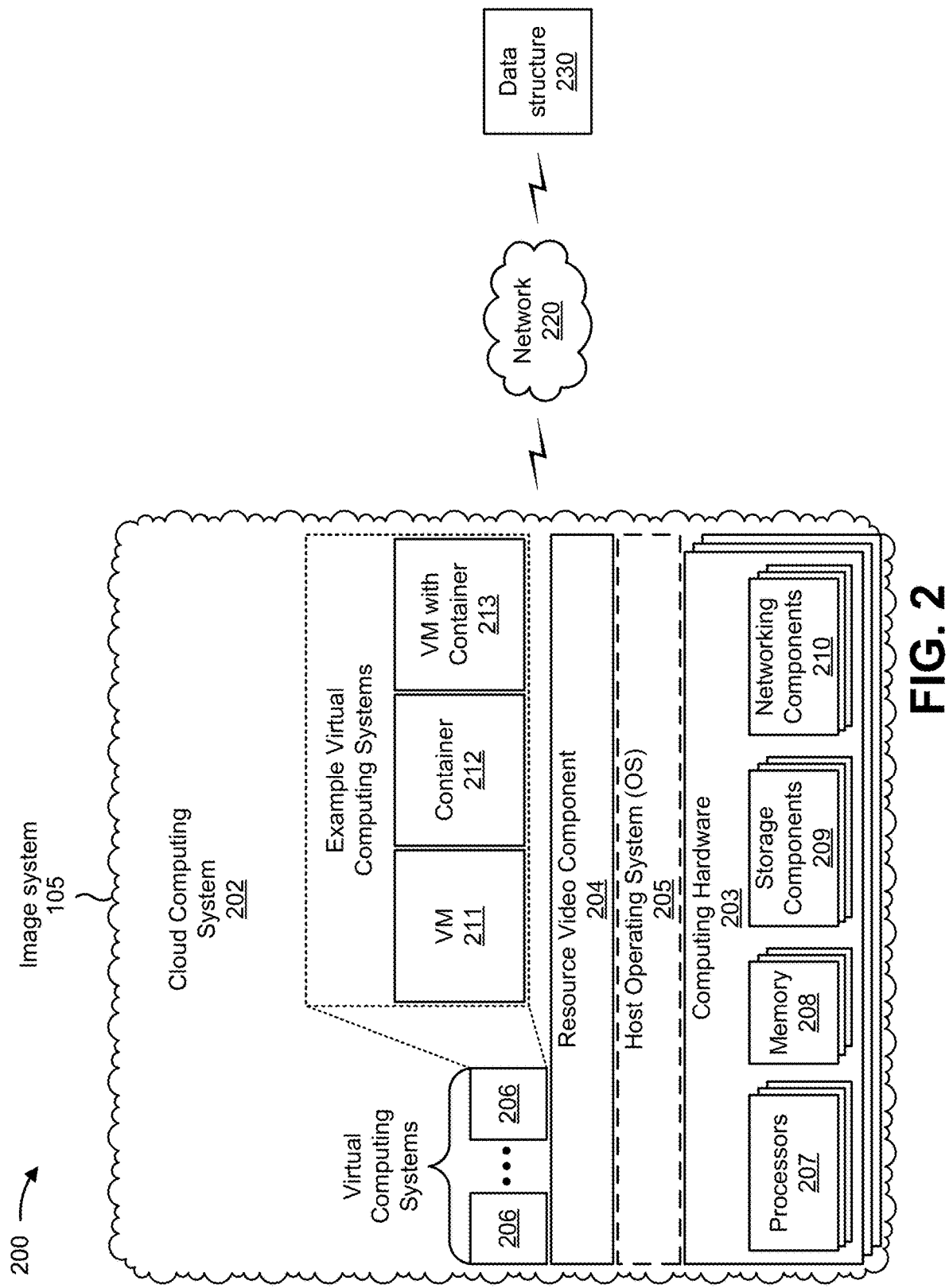
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the image system 105, which may include one or more elements of and/or may execute within a cloud computing system 202. The cloud computing system 202 may include one or more elements 203-213, as described in more detail below. As further shown in FIG. 2, the environment 200 may include a network 220 and/or a data structure 230. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the image system 105 may include one or more elements 203-213 of the cloud computing system 202, may execute within the cloud computing system 202, and/or may be hosted within the cloud computing system 202, in some implementations, the image system 105 may not be cloud-based (e.g., may be implemented outside of a cloud computing system) or may be partially cloud-based. For example, the image system 105 may include one or more devices that are not part of the cloud computing system 202, such as a device 300 of FIG. 3, which may include a standalone server or another type of computing device. The image system 105 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The data structure 230 may include one or more devices capable of receiving, generating, storing, processing, and/or providing information, as described elsewhere herein. The data structure 230 may include a communication device and/or a computing device. For example, the data structure 230 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 230 may communicate with one or more other devices of environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
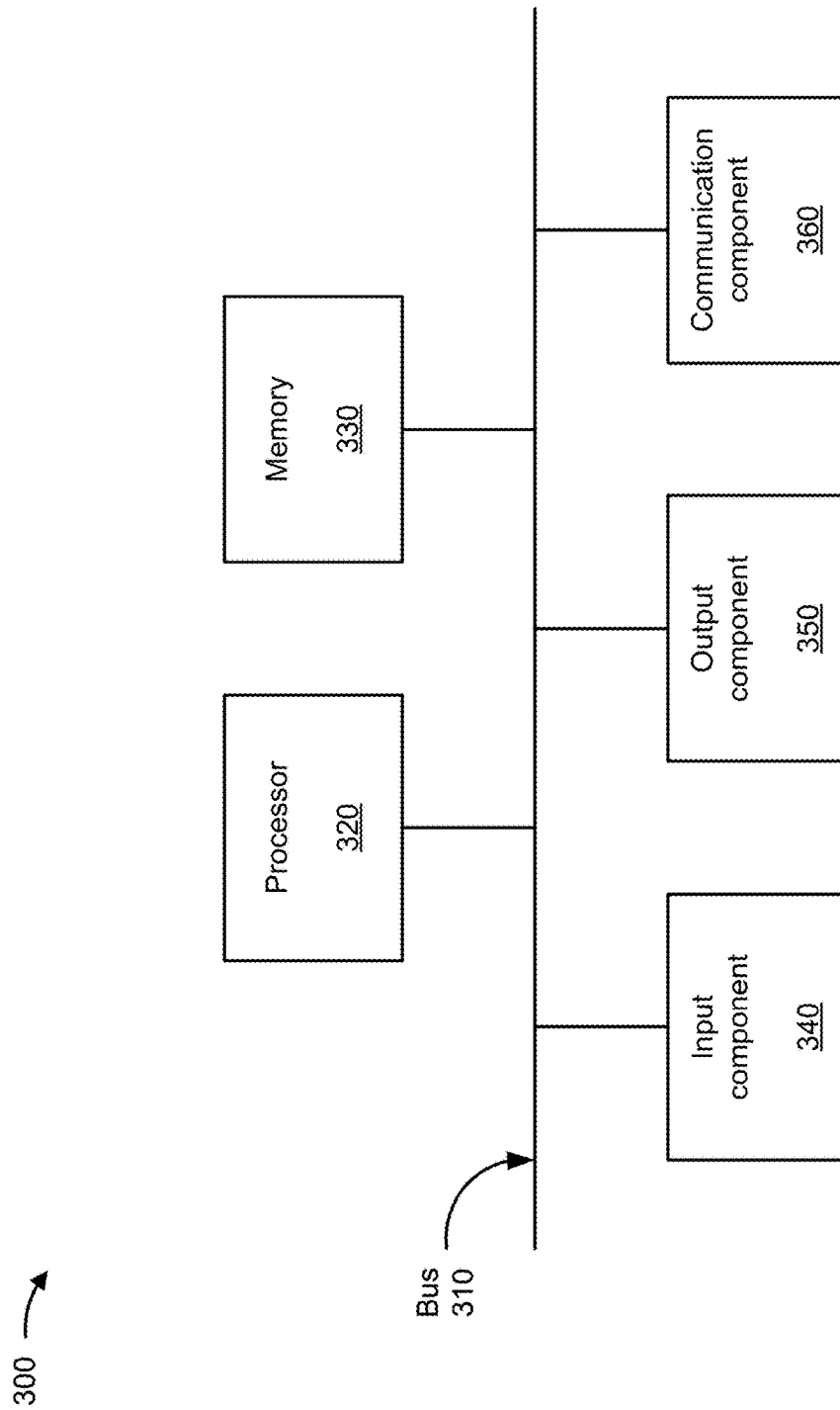
FIG. 3 is a diagram of example components of one or more devices of FIG. 2.

FIG. 3 is a diagram of example components of a device 300, which may correspond to the image system 105 and/or the data structure 230. In some implementations, the image system 105 and/or the data structure 230 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 depicts a flowchart of an example process 400 for utilizing a neural network model and templates to generate an image caption. In some implementations, one or more process blocks of FIG. 4 may be performed by a device (e.g., the image system 105). In some implementations, one or more process blocks of FIG. 4 may be performed by another device or a group of devices separate from or including the device. Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving narratives associated with scenes and an image identifying a scene (block 410). For example, the device may receive a plurality of narratives associated with a plurality of scenes and an image identifying a scene not included in the plurality of scenes, as described above.

As further shown in FIG. 4, process 400 may include processing the image, with a classifier model, to detect features in the image (block 420). For example, the device may process the image, with a classifier model, to detect a plurality of features in the image, as described above. In some implementations, the classifier model is a convolutional neural network multitask classifier model.

As further shown in FIG. 4, process 400 may include replacing keywords in the narratives, with tags, to generate sentences (block 430). For example, the device may replace keywords in the plurality of narratives, with tags, to generate a plurality of sentences, as described above. In some implementations, replacing the keywords in the plurality of narratives, with the tags, to generate the plurality of sentences includes identifying the keywords in the plurality of narratives, matching the tags with the keywords, and replacing the keywords in the plurality of narratives, with the tags, to generate the plurality of sentences based on matching the tags with the keywords.

As further shown in FIG. 4, process 400 may include grouping similar sentences of the sentences into clusters of templates (block 440). For example, the device may group similar sentences of the plurality of sentences, based on a defined measure of dissimilarity, into clusters of templates, as described above. In some implementations, grouping the similar sentences of the plurality of sentences, based on the defined measure of dissimilarity, into the clusters of templates includes utilizing an agglomerative cluster method to group the similar sentences of the plurality of sentences, based on a dissimilarity matrix, into the clusters of templates.

As further shown in FIG. 4, process 400 may include selecting a candidate template from each of the clusters to generate a set of candidate templates (block 450). For example, the device may select a candidate template from each of the clusters to generate a set of candidate templates, as described above. In some implementations, selecting the candidate template from each of the clusters to generate the set of candidate templates includes selecting the candidate template from each of the clusters, based on a cardinality of each of the clusters and based on a dissimilarity matrix of sentences in each of the clusters, to generate the set of candidate templates. In some implementations, each candidate template, of the set of candidate templates, is representative of a corresponding one of the clusters.

As further shown in FIG. 4, process 400 may include selecting a template from the set of candidate templates (block 460). For example, the device may select a template from the set of candidate templates, as described above. In some implementations, selecting the template from the set of candidate templates includes utilizing a greedy strategy to select the template from the set of candidate templates. In some implementations, selecting the template from the set of candidate templates includes selecting a plurality of templates from the set of candidate templates, and utilizing a set of conditions to select the template from the plurality of templates. In some implementations, selecting the template from the set of candidate templates includes processing the set of candidate templates, with a neural network model, to select the template from the set of candidate templates. In some implementations, the template is a modular template that includes textual information with a confidence prediction that satisfies a threshold.

As further shown in FIG. 4, process 400 may include populating tags of the template with the features detected in the image to generate an image caption (block 470). For example, the device may populate tags of the template with the plurality of features detected in the image to generate an image caption, as described above.

As further shown in FIG. 4, process 400 may include providing the image and the image caption for display (block 480). For example, the device may provide the image and the image caption for display, as described above.

In some implementations, process 400 includes storing the image and the image caption in a data structure, where the image stored in the data structure is searchable via textual query and based on the image caption. In some implementations, process 400 includes providing the image caption to a text-to-speech system configured to convert the image caption into audio.

In some implementations, process 400 includes receiving additional information associated with the image, and processing the image, with the classifier model, to detect the plurality of features in the image includes processing the image and the additional information, with the classifier model, to detect the plurality of features in the image.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device, a plurality of narratives associated with a plurality of scenes and an image identifying a scene not included in the plurality of scenes;
    processing, by the device, the image, with a classifier model, to detect a plurality of features in the image;
    replacing, by the device, keywords in the plurality of narratives, with tags, to generate a plurality of sentences;
    grouping, by the device, similar sentences of the plurality of sentences, based on a defined measure of dissimilarity, into clusters of templates;
    selecting, by the device, a candidate template from each of the clusters to generate a set of candidate templates;
    selecting, by the device, a template from the set of candidate templates;
    populating, by the device, tags of the template with the plurality of features detected in the image to generate an image caption; and
    providing, by the device, the image and the image caption for display.

2. The method of claim 1, further comprising:
    storing the image and the image caption in a data structure,
        wherein the image stored in the data structure is searchable via textual query and based on the image caption.

3. The method of claim 1, further comprising:
    providing the image caption to a text-to-speech system configured to convert the image caption into audio.

4. The method of claim 1, wherein the classifier model is a convolutional neural network multitask classifier model.

5. The method of claim 1, wherein replacing the keywords in the plurality of narratives, with the tags, to generate the plurality of sentences comprises:
    identifying the keywords in the plurality of narratives;
    matching the tags with the keywords; and
    replacing the keywords in the plurality of narratives, with the tags, to generate the plurality of sentences based on matching the tags with the keywords.

6. The method of claim 1, wherein grouping the similar sentences of the plurality of sentences, based on the defined measure of dissimilarity, into the clusters of templates comprises:
    utilizing an agglomerative cluster method to group the similar sentences of the plurality of sentences, based on a dissimilarity matrix, into the clusters of templates.

7. The method of claim 1, wherein selecting the candidate template from each of the clusters to generate the set of candidate templates comprises:

selecting the candidate template from each of the clusters, based on a cardinality of each of the clusters and based on a dissimilarity matrix of sentences in each of the clusters, to generate the set of candidate templates.

8. A device, comprising:
one or more processors configured to:
receive a plurality of narratives associated with a plurality of scenes and an image identifying a scene not included in the plurality of scenes;
process the image, with a classifier model, to detect a plurality of features in the image;
replace keywords in the plurality of narratives, with tags, to generate a plurality of sentences;
group similar sentences of the plurality of sentences, based on a defined measure of dissimilarity, into clusters of templates;
select a candidate template from each of the clusters to generate a set of candidate templates;
select a template from the set of candidate templates;
populate tags of the template with the plurality of features detected in the image to generate an image caption; and
store the image and the image caption in a data structure,
wherein the image stored in the data structure is searchable via textual query and based on the image caption.

9. The device of claim 8, wherein each candidate template, of the set of candidate templates, is representative of a corresponding one of the clusters.

10. The device of claim 8, wherein the one or more processors, to select the template from the set of candidate templates, are configured to:
utilize a greedy strategy to select the template from the set of candidate templates.

11. The device of claim 8, wherein the one or more processors, to select the template from the set of candidate templates, are configured to:
select a plurality of templates from the set of candidate templates; and
utilize a set of conditions to select the template from the plurality of templates.

12. The device of claim 8, wherein the one or more processors, to select the template from the set of candidate templates, are configured to:
process the set of candidate templates, with a neural network model, to select the template from the set of candidate templates.

13. The device of claim 8, wherein the template is a modular template that includes textual information with a confidence prediction that satisfies a threshold.

14. The device of claim 8, wherein the one or more processors are further configured to:
receive additional information associated with the image,
wherein the one or more processors, to process the image, with the classifier model, to detect the plurality of features in the image, are configured to:
process the image and the additional information, with the classifier model, to detect the plurality of features in the image.

15. A non-transitory computer-readable medium storing a set of instructions, the set of instructions comprising:
one or more instructions that, when executed by one or more processors of a device, cause the device to:
receive a plurality of narratives associated with a plurality of scenes and an image identifying a scene not included in the plurality of scenes;
process the image, with a classifier model, to detect a plurality of features in the image;
replace keywords in the plurality of narratives, with tags, to generate a plurality of sentences;
group similar sentences of the plurality of sentences, based on a defined measure of dissimilarity, into clusters of templates;
select a candidate template from each of the clusters to generate a set of candidate templates;
select a template from the set of candidate templates;
populate tags of the template with the plurality of features detected in the image to generate an image caption; and
perform one or more actions based on the image and the image caption.

16. The non-transitory computer-readable medium of claim 15, wherein the one or more instructions, that cause the device to perform the one or more actions, cause the device to one or more of:
provide the image and the image caption for display;
store the image and the image caption in a data structure; or
provide the image caption to a text-to-speech system configured to convert the image caption into audio to be played back.

17. The non-transitory computer-readable medium of claim 15, wherein the one or more instructions, that cause the device to replace the keywords in the plurality of narratives, with the tags, to generate the plurality of sentences, cause the device to:
identify the keywords in the plurality of narratives;
match the tags with the keywords; and
replace the keywords in the plurality of narratives, with the tags, to generate the plurality of sentences based on matching the tags with the keywords.

18. The non-transitory computer-readable medium of claim 15, wherein the one or more instructions, that cause the device to group the similar sentences of the plurality of sentences, based on the defined measure of dissimilarity, into the clusters of templates, cause the device to:
utilize an agglomerative cluster method to group the similar sentences of the plurality of sentences, based on a dissimilarity matrix, into the clusters of templates.

19. The non-transitory computer-readable medium of claim 15, wherein the one or more instructions, that cause the device to select the candidate template from each of the clusters to generate the set of candidate templates, cause the device to:
select the candidate template from each of the clusters, based on a cardinality of each of the clusters and based on a dissimilarity matrix of sentences in each of the clusters, to generate the set of candidate templates.

20. The non-transitory computer-readable medium of claim 15, wherein the one or more instructions, that cause the device to select the template from the set of candidate templates, cause the device to:
utilize a greedy strategy to select the template from the set of candidate templates.

* * * * *